Patented May 22, 1951

2,554,219

UNITED STATES PATENT OFFICE 2,554,219

METHOD OF MAKING FLUOROCARBON MONO-IODIDES

Joseph H. Simons and Thomas J. Brice, State College, Pa., assignors to Minnesota Mining & Manufacturing Company, St. Paul, Minn., a corporation of Delaware No Drawing. Application August 22, 1949, Serial No. 111,762

10 Claims. (Cl. 260—653)

The application relates to our discovery of a novel method of making saturated fluorocarbon mono-iodides.

These compounds contain only carbon, fluorine and iodine, and they are saturated compounds (i. e., the carbon atoms in the molecule are linked only by single valence bonds). They contain one or more carbon atoms and a single iodine atom in the molecule, the remainder being fluorine atoms. This class embraces both the non-cyclic (open chain) compounds, having the formula: $C_nF_{2n-1}I$ and the cyclic compounds, having the formula: $C_nF_{2n+1}I$ where $n$ is an integer. The cyclic compounds are of two types, those in which the iodine atom is bonded to a non-cyclic carbon atom of a side chain, and those in which the iodine atom is bonded to a cyclic carbon atom of a ring. A particular feature of the present process is that it can be employed both for the production of $CF_3I$ and for the production of polycarbon iodides, cyclic and non-cyclic, containing two or more carbon atoms in the molecule.

These compounds have value as chemical intermediates. The saturated fluorocarbons, consisting solely of carbon and fluorine, are characterized by a high degree of thermal stability and chemical inertness. The mono-iodide derivatives have an iodine atom which offers a point of ready attack for chemical reactions, thereby making possible the preparation of other fluorocarbon derivatives, and the introduction of fluorocarbon radicals into a variety of organic compounds. The reactivity of these saturated fluorocarbon mono-iodides is greater than that of the corresponding mono-chlorides and mono-bromides. Various methods which have proved quite satisfactory for preparing the mono-chlorides and mono-bromides have been found ineffective for preparing the mono-iodides, and this serves further to illustrate the unique properties of these compounds as well as the difficulty of preparing them.

The present compounds yield simple metal-containing fluorocarbon derivatives when reacted with active metals, and these have great value as intermediates in synthesis. In contrast, compounds containing more than one iodine atom tend to be unstable and reaction with active metals results generally in olefin formation or in complicated products.

Briefly stated, the present method of making saturated fluorocarbon mono-iodides comprises heating together an anhydrous mixture of iodine and a silver salt of a saturated fluorocarbon monocarboxylic acid, in admixture with an inert diluent (solid or liquid), to a temperature of the order of 100 to 200° C. (which embraces but is not confined to the range between the melting and boiling points of iodine), thereby resulting in evolution of the desired reaction product, and recovering the latter. Higher temperatures can be used.

The present method thus comprises reacting together iodine and a compound having the formula R—COOAg (where R is a saturated fluorocarbon radical) to obtain a reaction product having the formula RI. The end result is to replace the —COOAg group with an iodine atom.

Examples of inert solid diluents are dry, finely divided, sand, pumice, porcelain and glass.

The use of inert liquid diluents is greatly preferred since the mixture is readily agitated and local hot spots are avoided, and higher yields can be obtained. A necessary requirement is that the liquid vehicle be anhydrous and be rigorously inert, for unless it is the desired fluorocarbon mono-iodide product will not be formed. Thus carbon tetrachloride, pyridine, and hydrocarbon liquids (aliphatic and aromatic) such as hexane and benzene, cannot be employed because they are not sufficiently inert despite the absence of water.

We have found that inert saturated liquid fluorocarbon compounds can be used as diluents in the present process.

The saturated true fluorocarbons, consisting solely of carbon and fluorine atoms, can be used. We have also found that saturated fluorocarbon derivatives wherein oxygen or nitrogen atoms are linked between carbon atoms and the carbon atoms of the skeletal structure are otherwise saturated with fluorine so as to render the compound inert, are possessed of the requisite inertness. These compounds are all immiscible with water. Use can be made of saturated fluorocarbon ethers, and of saturated fluorocarbon tertiary amines. Preferably those fluorocarbon compounds having twelve or more carbon atoms in the molecule are employed as these have boiling points of the order of 175° C. and higher. Liquids of lower boiling point can be satisfactorily employed when the process is carried out under adequate reflux conditions, or under combinations of pressure and temperature which maintain the diluent in liquid phase.

A mixture of solid and liquid diluents can be employed, such as a mixture of finely divided sand and an inert fluorocarbon compound.

An example of a high-boiling fluorocarbon ether is di-tridecafluorohexyl ether, $$C_6F_{13}OC_6F_{13}$$

having a boiling point of about 172° C. An example of a high-boiling fluorocarbon tertiary amine is tri-nonafluorobutyl amine, $(C_4F_9)_3N$, having a boiling point of about 177° C.

The silver salts of saturated fluorocarbon monocarboxylic acids, used as starting compounds, are solid at room temperature. The following are exemplary:

$CF_3COOAg$        $C_7F_{15}COOAg$
$C_2F_5COOAg$      $C_9F_{19}COOAg$
$C_3F_7COOAg$      $c$—$C_6F_{11}COOAg$
$C_5F_{11}COOAg$   $c$—$C_6F_{11}CF_2COOAg$

The following examples serve to illustrate suitable procedures which have been employed:

EXAMPLE 1

The apparatus was a 500 c. c. round-bottom glass flask fitted with a thermometer and a simple distilling head leading through a water-cooled condenser to a receiver at room temperature and thence to a trap cooled by liquid air. The flask was heated over a sand bath.

The iodine was dried and purified by distilling from phosphorus pentoxide $(P_2O_5)$.

Dry silver trifloroacetate $(CF_3COOAg)$ was used as the other starting compound.

In the flask was placed a well dispersed mixture consisting of 70 grams of the iodine, 40 grams of the silver salt, and about 200 grams of dry clean sand. The mixture was heated slowly. The desired reaction appeared to start at about 110° C., when gas was given off, and continued up to about 150° C. Gases were condensed in the liquid-air trap, and a liquid contaminated with iodine collected in the room-temperature receiver.

The material from the liquid-air trap was washed with base and yielded 12 grams of material boiling at minus 24 to minus 23° C. Its molecular weight was 196-198 as determined from vapor density. Analysis showed 29.3% fluorine and 65.6% iodine. The values for pure $CF_3I$ as calculated from the formula are: molecular weight 196, 29.0% fluorine, 64.8% iodine.

The analysis was accomplished by fusing a dry, air-free sample with sodium metal, dissolving the resultant salts in water, filtering to remove carbon, and determining iodine and fluorine by Volhard and thorium nitrate titrations.

EXAMPLE 2

The procedure was essentially the same as in the preceding example.

The material placed in the flask consisted of a thoroughly dry, intimate admixture of 20 grams of normal silver heptafluorobutyrate $(C_2F_7COOAg)$, 14 grams of iodine, and about 150 grams of sand.

The flask was heated slowly to 50° C. at which point the heat of reaction raised the temperature, without external heating, to 80° C. The mixture had turned a bright yellow at this point. Heating was resumed and at about 110° C. there was evolution of gas and a small amount of liquid. The flask was heated to 180° C. and gas evolution stopped after about one-half hour. The evolved material was virtually all found in the liquid-air trap. The material from the liquid-air trap was twice passed through a tube packed with sodium hydroxide, and was then fractionated. A fraction was obtained having a boiling range of 37.3 to 39.3° C., the bulk of the material boiling at 39.3° C.

This fraction was found to have a molecular weight of 299, and analysis showed 42.0% iodine. The values for pure $C_3F_7I$ as calculated from the formula are: molecular weight 296, percent iodine 42.9.

EXAMPLE 3

A 500 cc. round-bottomed flask equipped with a thermometer well, mercury-sealed stirrer, and a 19 mm. diameter air condenser was used as the reactor; the air condenser was connected to traps cooled in ice and liquid air. The reactor was charged with 172 g. (0.68 mole) of iodine which had been resublimed from phosphorus pentoxide, 75 g. (0.34 mole) of dry silver trifluoroacetate and 88 g. of purified $(C_4F_9)_3N$. The $CF_3COOAg$:iodine mole ratio was 1:2. The reactor was heated slowly on a sand bath with vigorous stirring. The evolution of gases started at about 100° C., and heating was continued until the reactor had been at 130±5° C. for two hours and gas evolution had ceased. Dry air was passed through the reactor to carry any product into the ice and liquid air-cooled traps. The products collected in the liquid air-cooled trap, 79.5 g., were passed repeatedly over moist KOH pellets, and the lowest boiling material (which was presumed to be chiefly carbon dioxide) was absorbed by the KOH pellets. The material was then fractionated in a low temperature column. There was obtained 52 g. of material boiling at −21 to −23° C. at atmospheric pressure, having a molecular weight of 193-196 after the removal of traces of acid gases, identified as relatively pure $CF_3I$. The column residue, 7.5 g., had a molecular weight of 187-195 and was primarily $CF_3I$. The total yield of $CF_3I$, including column residue, was 91%.

EXAMPLE 4

The reactor of the preceding example was loaded with 102 g. (0.40 mole) of dry iodine, 62.5 g. (0.20 mole) of dry silver heptafluorobutyrate $(CF_3CF_2CF_2COOAg)$, and 50 g. of $(C_4F_9)_3N$. The reactor was heated as before. The evolution of gas started at about 90° C. and was complete after one-half hour at 115±5° C. The reactor was swept out with dry nitrogen so that all volatile substances were carried over into the ice and liquid air-cooled traps. The traps were allowed to warm to room temperature while connected to KOH bubblers and a liquid-air trap. All of the material boiling below room temperature, 9 g., was found to be absorbed by the KOH solutions. The material left, 50 g., was shaken with mercury to remove traces of iodine. Crude yield of $CF_3CF_2CF_2I$ was 89%. The material was fractionated in a conventional metal-packed column. There was obtained 39 g. of purified $CF_3CF_2CF_2I$ boiling at 39° C. at 735 mm. Yield of redistilled product was 68%.

Preparation of the fluorocarbon silver salts

The saturated fluorocarbon monocarboxylic acids (RCOOH, where R is a saturated fluorocarbon radical) are extremely strong acids, the acid strength of aqueous solutions being of the same order of magnitude as that of strong mineral acids, whereas the corresponding hydrocarbon acids are relatively weak. These acids readily react with the oxides and carbonates of silver to form the corresponding silver salts (RCOOAg)

employed as starting compounds in the method of the present invention.

These fluorocarbon acids can be made by hydrolyzing the corresponding fluorocarbon acid fluorides (RCOF) which are highly reactive and readily react with water to form the carboxylic acid derivatives.

The fluorocarbon acid fluorides can be made by electrolyzing a solution of anhydrous liquid hydrogen fluoride containing a dissolved hydrocarbon monocarboxylic acid of corresponding carbon skeletal structure, or its anhydride, by passing direct current through the solution at a cell voltage which is insufficient to generate molecular (free elemental) fluorine under the existing conditions, but which is sufficient to cause the formation of the fully fluorinated acid fluoride derivative at a useful rate.

Thus butyric acid can be employed as the starting compound for making $C_3F_7COF$ by the electrochemical process, and this is hydrolyzed to $C_3F_7COOH$ from which the silver salt, $$C_3F_7COOAg$$

is made.

Excellent results can be obtained with simple single compartment electrolytic cell arrangements. No diaphragm is needed between electrodes. The cell can be readily operated at atmospheric pressure, employing a cell temperature in the neighborhood of 0° C. The cell and the cathodes can be made of iron or steel, and the anodes of nickel, and such cells have been satisfactorily operated at approximately 5 to 6 volts, D. C.

The fluorocarbon acid fluoride product of the cell operation is relatively insoluble in the electrolyte solution and either settles to the bottom of the cell from which it can be drained with other fluorocarbon products of the process, or is volatilized and evolves from the cell in admixture with the hydrogen and other gaseous products. The fluorocarbon acid fluoride compound can be hydrolyzed to the fluorocarbon acid while still mixed with other products and this can be separated and recovered. Another procedure is to react the acid fluoride with ammonia to produce the amide, a solid compound which can be readily separated and purified, and then hydrolyze the latter to produce the fluorocarbon acid.

*Preparation of the fluorocarbon compound diluents*

The saturated fluorocarbons can be prepared in ways previously known to the art.

The saturated fluorocarbon ethers and amines can be prepared by the previously mentioned electrochemical process, using the corresponding hydrocarbon ethers and tertiary amines as starting compounds dissolved in the liquid hydrogen fluoride. The fully fluorinated product compounds settle to the bottom of the cell from which they can be drained (mixed with other products), washed with base, and fractionally distilled.

The electrochemical process is broadly described and claimed in the patent of J. H. Simons, No. 2,519,983, issued on August 22, 1950. The higher fluorocarbon acids and their salts (including silver salts) are described and claimed in the copending application of A. H. Diesslin, E. A. Kauck and J. H. Simons, S. N. 70,154, filed January 10, 1949, which also describes the electrochemical process. The fluorocarbon tertiary amines are described and claimed in the copending application of E. A. Kauck and J. H. Simons, S. N. 29,955, filed May 28, 1948 (since abandoned in favor of S. N. 161,717, filed May 12, 1950); and the fluorocarbon ethers in the patent of J. H. Simons, No. 2,500,388, issued on March 14, 1950.

The polycarbon fluorocarbon mono-iodides are claimed as new compounds in our companion application S. N. 111,761, filed of even date herewith.

Having described various embodiments of the invention for purposes of illustration rather than limitation, what we claim is as follows:

1. The method which comprises heating together an anhydrous mixture of iodine and a silver salt of a saturated fluorocarbon monocarboxylic acid, admixed with a rigorously inert diluent, to a temperature of at least about 100° C. at which a saturated fluorocarbon mono-iodide reaction product is evolved, and recovering the latter.

2. The method which comprises heating together an anhydrous mixture of iodine and a saturated fluorocarbon silver salt having the formula $C_nF_{2n+1}COOAg$, admixed with a rigorously inert diluent, to a temperature of at least about 100° C. at which a saturated fluorocarbon mono-iodide reaction product is evolved, and recovering the latter.

3. The method of claim 1 wherein a finely divided inert solid diluent is used.

4. The method of claim 1 wherein an inert liquid fluorocarbon compound is used as a diluent.

5. The method of claim 1 wherein an inert liquid fluorocarbon ether is used as a diluent.

6. The method of claim 1 wherein an inert liquid fluorocarbon tertiary amine is used as a diluent.

7. The method of claim 2 wherein a finely divided inert solid diluent is used.

8. The method of claim 2 wherein an inert liquid fluorocarbon compound is used as a diluent.

9. The method of claim 2 wherein an inert liquid fluorocarbon ether is used as a diluent.

10. The method of claim 2 wherein an inert liquid fluorocarbon tertiary amine is used as a diluent.

JOSEPH H. SIMONS.
THOMAS J. BRICE.

REFERENCES CITED

The following references are of record in the file of this patent:

UNITED STATES PATENTS

| Number | Name | Date |
|---|---|---|
| 643,144 | Lederer | Feb. 13, 1900 |
| 2,176,181 | Hunsdiecker et al. | Oct. 17, 1939 |

FOREIGN PATENTS

| Number | Country | Date |
|---|---|---|
| 199,643 | Switzerland | Nov. 16, 1938 |